United States Patent [19]

Takada

[11] 4,375,897
[45] Mar. 8, 1983

[54] COUPLING FOR JOINING A DRIVE WIRE TO A BELT TRANSFER MEMBER

[76] Inventor: Juichiro Takada, 3-12-1, Shinmachi, Setagayaku, Tokyo, Japan

[21] Appl. No.: 226,254

[22] Filed: Jan. 19, 1981

[30] Foreign Application Priority Data

Jan. 23, 1980 [JP] Japan .................................. 55-5927

[51] Int. Cl.$^3$ ............................................. B60R 21/02
[52] U.S. Cl. .................................... 280/804; 297/469
[58] Field of Search ............... 280/801, 802, 804, 806; 297/469, 486

[56] References Cited

U.S. PATENT DOCUMENTS 3,882,955  5/1975  Kaneko et al. ...................... 280/804
3,915,254  10/1975  Nagano et al. ..................... 280/804
3,971,570  7/1976  Nilsson ............................. 280/804

Primary Examiner—Richard A. Bertsch
Attorney, Agent, or Firm—Brumbaugh, Graves, Donohue & Raymond

[57] ABSTRACT

In a passive vehicle occupant restraint belt system having a belt that is coupled to a transfer member and a drive wire of a drive device that moves the transfer member along a guide rail between restraint and release positions in response to closing and opening of the door, the drive wire is coupled to the transfer member by a resilient coupling that is pre-assembled on a terminal on the drive wire and that is pushed onto a post on the transfer member. Resilient tangs on the connector member engage a stop shoulder, such as thread teeth, on the post.

1 Claim, 6 Drawing Figures

FIG. 3
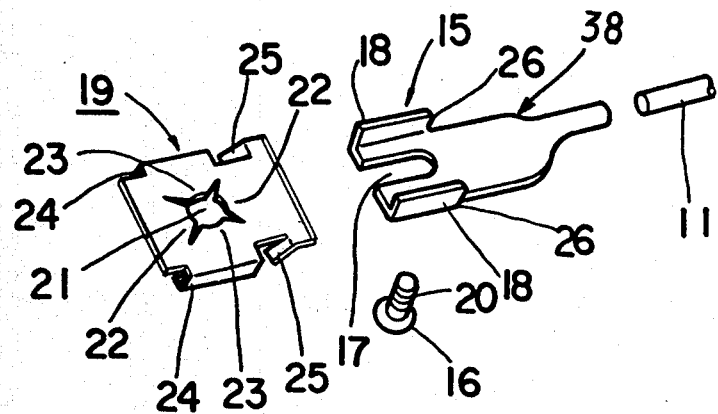
FIG. 4
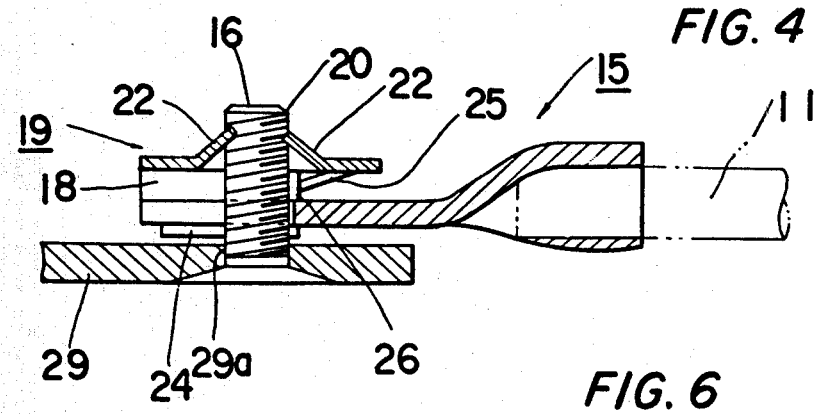
FIG. 5
FIG. 6
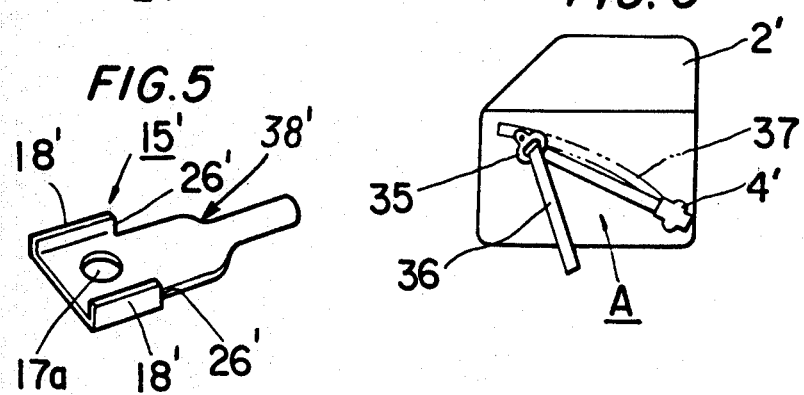

COUPLING FOR JOINING A DRIVE WIRE TO A BELT TRANSFER MEMBER

The present invention relates to passive vehicle occupant restraint belt systems and, in particular, to a coupling assembly for connecting a drive wire to a belt transfer member.

BACKGROUND OF THE INVENTION

Considerable development work has been done in recent years on passive vehicle occupant safety restraint systems in anticipation that new vehicles will be required by law to have such systems. Many of the proposed passive restraint belt systems include a belt transfer member that engages a portion of a restraint belt and is driven along a guide rail between restraint and release positions by a drive device in response to opening and closing of the vehicle door. In addition to developing basic systems and the components required for those systems, the industry has had to confront the problems that will arise on the vehicle assembly line in the installation of the restraint system. An object of the present invention is the simplification of installation of a passive restraint belt system in a vehicle.

SUMMARY OF THE INVENTION

There is provided, in accordance with the present invention, a novel push-on coupling assembly for connecting the drive wire of a drive device to a belt transfer member. The coupling assembly facilitates installation of a passive belt system by permitting a guide subassembly and a drive subassembly to be installed in the vehicle at different assembly stations and then quickly and easily connected at the later of those assembly stations or at a subsequent station.

A coupling assembly, according to the present invention, is suited for use with passive restraint belt system of various specific designs within the general category characterized by a belt transfer member that is driven by a drive wire along a guide rail. The transfer member may be a guide ring or a moving anchor; the guide rail can be at the edge of the roof above the door or on the lower portion of the door; the drive device may have a gear-reduced electric motor or a mechanical motion amplifier which multiplies door motion.

The coupling assembly comprises a post that is affixed to the belt transfer member and includes at least one retaining shoulder facing the transfer member. Preferably, multiple shoulders in the form of the teeth or threads are provided on the post. The post receives a pre-assembly composed of a terminal affixed to the end of the drive wire and a resilient coupling member retained on the terminal by means of mating side flanges on the terminal and coupling member and by lugs on the coupling member that engage retaining shoulders on the terminal that face away from the free end of the terminal. The terminal and coupling member have registering holes that receive the post on the belt transfer member. The hole in the coupling member is defined by the free ends of a multiplicity of radially arranged, resilient tangs; the hole is normally smaller than the post so that the tangs are resiliently deflected when in place on the post. The tangs engage the retaining shoulder on the post and keep the coupling member from sliding off the end of the post.

The invention greatly simplifies the installation of the restraint system. A drive sub-assembly and a guide sub-assembly can be separately installed and are easily connected by merely pressing the coupling and terminal in place on the post; no tools are required, and the worker need not have any parts because the drive subassembly can include the coupling member as a pre-installed part. The resiliency of the coupling member means that it is not susceptible to loosening and rattling when the vehicle is driven. The coupling is, nonetheless, readily disassembled for repair of the system, if required, by prying back the tangs or by releasing the lugs of the terminal and unthreading the coupling in the case of the preferred coupling assembly design. Uncoupling for repair also means that replacement subassembly units can be stocked for replacements at lower cost for purchase and installation than would be the case with permanently assembled units.

For a more complete understanding of the present invention, reference may be made to the following description of exemplary embodiments, taken in conjunction with the accompanying drawings.

DESCRIPTION OF THE DRAWINGS

FIG. 3 is an exploded pictorial view of the principal components of the coupling assembly shown in FIG. 2;

FIG. 4 is a top cross-sectional view of the coupling assembly shown in FIGS. 2 and 3;

FIG. 5 is a pictorial view of a modified terminal for the coupling assembly; and FIG. 6 is a generally schematic side elevational view of another restraint belt system in which the invention is useful.

DESCRIPTION OF EXEMPLARY EMBODIMENTS

Figure 1:
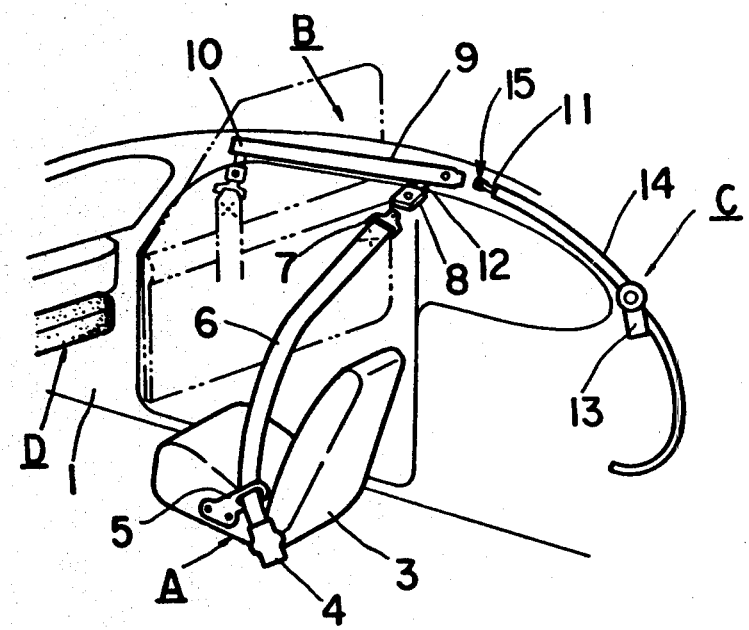
FIG. 1 is a pictorial view in generally schematic form of an exemplary passive safety belt system.

The passive restraint belt system shown in FIG. 1 comprises a shoulder belt 6 that leads from an emergency locking retractor 4 affixed to the floor of the vehicle body 1 near the lower rear inboard portion of the seat 3 through a guide 5 affixed to the seat and then upwardly and outwardly to a moving anchor 12. The belt 6 is connected to the moving anchor 12 by an emergency buckle 8 that receives a tongue 7 secured to the free end of the belt. The moving anchor 12 is driven forward and backward along a guide rail 10 installed along the edge of the vehicle roof 9 above the vehicle door by a drive that includes a gear-reduced electric motor 13 and a racked wire 11 driven by the motor 13 and received within a guide tube 14. The racked wire 11 is connected to the moving anchor 12 by a coupling assembly 15 embodying the present invention. The restraint system shown in FIG. 1 also includes an energy absorbing knee bolster D located under the dashboard.

In terms of the installation of the restraint belt system in the vehicle as the vehicle is assembled, the restraint system comprises four subassemblies, each of which can be installed at a different station along the production line. The four subassemblies are:

(1) the belt subassembly A (the retractor 4, belt 6 and guide 5);

(2) the guide subassembly B (the moving anchor 12 and guide rail 10);

(3) the drive subassembly C (the motor 13, racked wire 11 and guide tube 14), and (4) the knee bolster subassembly D.

The belt subassembly A can, of course, be conveniently connected to the guide subassembly B at any time following installation of the subassemblies A and B by merely inserting the buckle tongue 7 into the buckle 8. The coupling assembly 15 considerably facilitates the connection of the racked wire 11 to the moving anchor 12 following installation of the drive subassembly C and the guide subassembly B and makes it possible for the two subassemblies B and C to be installed at different stations along the production line.

Figure 2:
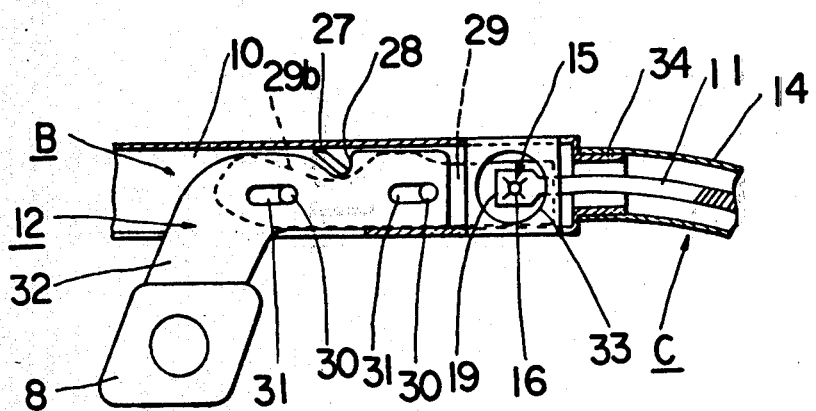
FIG. 2 is a fragmentary side cross-sectional view of an embodiment of a coupling assembly.

Referring next to FIG. 2, the moving anchor 12 and the associated components for locking the moving anchor at the rearward end of the guide rail 10 are of a type described and shown in U.S. patent application Ser. No. 044,196 filed May 31, 1979, by the present inventor. The moving anchor 12 consists of an anchor member 32 in the form of a generally L-shaped plate, the dependent arm of which carries the emergency release buckle 8, and a cam member 29 that is also a metal plate. The cam member and anchor member are connected to each other for limited lost motion relative to each other in a direction lengthwise of the guide rail 10 by a pair of pins 30 on the cam member 29 that pass through elongated holes 31 in the anchor member 32. The racked wire 11 of the drive is connected by the coupling assembly 15 to the cam member. When the racked wire 11 pulls the moving anchor 12 rearwardly to the restraint position at the rearward end of the guide rail 10, a locking pawl 27 installed in the guide rail in triangular notches in the walls of the rail drops into locking position in a locking notch 28 in the anchor member. A camming notch 29b in the cam member 29 permits the pawl 27 to achieve the locking position shown in FIG. 2.

When the racked wire is driven forwardly, it pushes the cam member 29 from right to left (relative to FIG. 2), and the cam notch 29 lifts the pawl 27 upwardly out of the locking notch 28, motion of the cam member 29 from right to left relative to the anchor member 32 being permitted by the lost motion pin and hole connections 30 and 31 between the cam member and anchor member. Upon completion of the lost motion of the cam member, the locking pawl 27 is released from the locking notch 28 and the moving anchor is driven forward along the guide rail 10 to the release location adjacent the front end of the rail, as shown in phantom lines in FIG. 1.

The coupling assembly 15 is of a type which is done up by merely pressing a resilient coupling member 19 onto a post 16. The coupling assembly is accessible for installation through an access hole 33 in the interior wall of the guide rail 10.

Referring to FIGS. 3 and 4, the coupling assembly includes the aforementioned resilient coupling member 19, the post 16 and a terminal 38. The post 16 is a threaded stud that is installed in a hole 29a in the cam member 29. Each of the threads 20 of the post 16 constitutes a locking shoulder for retaining the coupling member 19 on the post. Accordingly, instead of having threads, the post 16 can have one or more shoulders or other forms of locking teeth.

The coupling member 19 is stamped and bent from spring steel sheet. It has a central hole 21 that is defined by the free ends of two pair of oppositely disposed, radially oriented tangs 22 and 23 formed by radial slits extending out from the hole 21. Each tang is slightly bent up from the base wall of the member. An L-shaped flange 24 depends from each side edge of the base wall and embraces a corresponding side flange 18 on the terminal 38. The coupling member 19 is constructed to be pre-installed on the terminal and retained thereon by bent down lugs 25 on the coupling member 19 that engage locking shoulders 26 defined by the ends of the side flanges 18 on the terminal. The terminal is crimped onto the end of the racked wire 11 and has a slot 17 that lines up with the hole 21 in the coupling member.

To do up the coupling, the pre-assembled terminal and coupling member are inserted endwise into the rear end of the guide rail 10 and pressed onto the post 16, access being afforded by the access hole 33 for this procedure. When the coupling member 19 is pushed onto the post, the tangs 22 and 23 are resiliently deflected to a more upwardly inclined orientation and engage the threads 20. The tangs 22 and 23, accordingly, keep the coupling member 19 from sliding off the end of the base in a direction away from the cam member 29, and the engagement member of the locking lugs 25 with the shoulders 26 on the terminal 28 keep the terminal from pulling endwise from left to right out of the coupled condition. Meanwhile, the forward end of the guide tube 14 is slipped onto a round fitting 34 at the rearward end of the guide rail 10, and suitably secured.

In accordance with a modification of the coupling assembly 15, as shown in FIG. 5, a modified terminal 38' having a hole 17a instead of an open-ended slot 17 may be used in place of the terminal 38 shown in FIGS. 3 and 4.

A coupling assembly constructed in accordance with the present invention can be used with various other restraint belt systems. For example, a system like the one shown in FIG. 1, but employing a drive located adjacent the front end of the door and thus pushing the anchor member from the forward release position to the rearward restraint position, can utilize the coupling assembly. The coupling assembly can also be used to connect a movable belt guide ring to a drive wire. The restraint system can, of course, be of a type that uses a mechanical motion amplifier associated with the vehicle door in place of an electric motor drive. The guide rail for the moving anchor or belt guide ring may, in some systems, be installed on the vehicle door or an inboard location in the vehicle. For example, the system shown in FIG. 6 comprises a belt guide ring 35 that moves along a guide rail 37 on the vehicle door 2'. A lap belt 36 is transferred between restraint and release locations at the rearward and forward positions along the rail 37 by a drive (not shown) coupled to the guide ring 35 by the coupling assembly. The lap belt 36 leads from an anchor located adjacent the inboard rear portion of the seat through the movable guide ring 35 to an emergency locking retractor 4' affixed at the lower rear corner of the door.

Thus, the present invention provides an economical and effective way of connecting a drive subassembly to a guide subassembly, thereby facilitating the installation of a passive restraint belt system by making it possible for those subassemblies to be installed at different work stations in a production line. The coupling assembly is not susceptible to loosening by virtue of the resiliency of the coupling member 19. Should repair to either the drive assembly or guide assembly be required, the coupling assembly can be undone by springing the tangs 22 and 23 apart and sliding the coupling member and terminal member endwise off the post.

I claim:

1. In a passive vehicle occupant restraint belt system having a restraint belt, a guide rail, a belt transfer member coupled to a portion of the belt and movable along the guide rail, and drive means including a drive wire for moving the transfer member along the guide rail between occupant-restraining and occupant-releasing positions in response to closing and opening of the vehicle door, a coupling assembly joining the drive wire to the transfer member and comprising a post affixed to the transfer member and including at least one retaining shoulder facing the transfer member, a resilient coupling member having a multiplicity of radially arranged resilient tangs, the free ends of which define a hole that is normally slightly smaller than the post cross section, the coupling member being receivable on the post with the free ends of the tangs resiliently engaging the post and stopped by the shoulder from sliding off the end of the post, and a connector terminal affixed to the end of the drive wire, the terminal having a hole receiving the post and a pair of side flanges, each of which includes a locking shoulder that faces away from the free end of the terminal, and the coupling member further including a pair of generally L-shaped side retainer flanges that engage the side flanges of the terminal and a pair of lugs that engage the respective locking shoulders of the terminal, whereby the coupling member is adapted to be pre-assembled with the terminal on the drive wire and the coupling assembly is adapted to be finally assembled to connect the drive wire to the transfer member by pushing the pre-assembled coupling member and terminal onto the post.

* * * * *